United States Patent [19]

Izumi

[11] 4,056,844
[45] Nov. 1, 1977

[54] MEMORY CONTROL SYSTEM USING PLURAL BUFFER ADDRESS ARRAYS

[75] Inventor: Chikahiko Izumi, Hatano, Japan

[73] Assignee: Hitachi, Ltd., Japan

[21] Appl. No.: 620,757

[22] Filed: Oct. 8, 1975

[30] Foreign Application Priority Data

Feb. 26, 1974 Japan .................................. 49-22473

[51] Int. Cl.² .......................................... G06F 13/00
[52] U.S. Cl. ...................................... 364/200; 364/900
[58] Field of Search ................... 340/172.5; 364/900, 364/200

[56] References Cited

U.S. PATENT DOCUMENTS

| | | | |
|---|---|---|---|
| 3,339,183 | 8/1967 | Bock | 340/172.5 |
| 3,581,291 | 5/1971 | Iwamoto | 340/172.5 |
| 3,618,040 | 11/1971 | Iwamoto | 340/172.5 |
| 3,771,137 | 11/1973 | Barner | 340/172.5 |

Primary Examiner—James D. Thomas
Attorney, Agent, or Firm—Craig & Antonelli

[57] ABSTRACT

In a data processing system in which a single main memory is shared by two or more basic processing units, each unit is provided with a first buffer address array which stores the addresses of data stored in the associated buffer memory and is searched by this processing unit and with second buffer address arrays which store the copy of the content of the first buffer address array and are searched by the store addresses from the other processing units, so that the information stored in the buffer memory of one processing unit may be prevented from becoming different from the information stored in the main memory when another processing unit performs a storing operation, without degrading the processing efficiency of the system.

7 Claims, 6 Drawing Figures

MEMORY CONTROL SYSTEM USING PLURAL BUFFER ADDRESS ARRAYS

BACKGROUND OF THE INVENTION

1. Field of the Invention

The present invention relates to the control of a buffer memory incorporated in a data processing system.

2. Description of the Prior Art

In a data processing system, the time required for accessing a main memory is usually longer than that for arithmetical operation by a processor. To shorten the data processing time, especially the access time, a buffer memory is incorporated in the processor which memory has a shorter access time than the main memory though it has a smaller memory capacity. The buffer memory stores a partial copy of the content of the main memory. In the operation of reading instructions or operands, if the buffer memory stores a copy of data to be read out of the main memory, the copy is read out of the buffer memory so as to diminish the access time.

A table called an address array is provided to indicate which part of the copy of the main memory content is stored in the buffer memory.

The address array is such a table that stores the address of the main memory whose data is stored in the buffer memory correspondingly to the respective blocks of the buffer memory to indicate the correspondence between the main memory and the buffer memory. Each block is the shortest unit of data transferred for copy from the main memory. Accordingly, the content of the address array must be renewed each time the block transfer takes place, so that the address array and the buffer memory operate correspondingly with each other.

Block transfer means the operation in which desired data is transferred from the main memory to the buffer memory to be stored therein.

In a multiprocessing system in which a plurality of data processors, each having a buffer memory, share a single main memory, the following disadvantages may happen. If all or a part of the content of the main memory is rewritten by one data processor, the content of the buffer memory of another data processor which stores the copy of a part of the old content of the main memory necessarily becomes different from the renewed content of the main memory.

Moreover, the same disadvantage takes place when data are additionally written in the main memory by an imput-output processor. Therefore, also in this case, the content of the address array must be accordingly renewed.

According to the conventional multiprocessing system using data processors of congruent type or of set-associative type, whenever data are stored in the main memory, the main memory addresses of the stored data are given to the processors so as to make the contents of the buffer memories of the processors identical, i.e., up to date, with the corresponding parts of the content of the main memory. Namely, at every storing operation (including data transfer from the input-output device to the main memory), the content of the buffer memory of each processor is renewed and the contents of the corresponding columns of the buffer address arrays in the buffer memories of the other processors are checked by the store address. When the store address and the block address registered in a buffer address array are found coincident with each other, the validity bit of the block address is reset or the store address is transferred to other processors to be written in the associated buffer memories.

However, this system mentioned directly above has a drawback in that the arithmetic processing by the processors is stagnant, since this system is an instant response type in which the processing is advanced only after the fact that the other processors which have received the store address have been checked. In the case where at most two processors are used, it is relatively easy to restrict such a drawback to a negligible extent, but if three or four or more processors are used, the drawback proves to be fatal to a high speed basic processor. In order to eliminate such a fatal drawback, there is proposed a method in which the flow of the ordinary processing is kept uniform by the provision of a stack of address registers at the entrance of the store address. However, owing to the provision of the stack, this system requires an increase in hardware and a complicated control for checking the addresses so as not to disturb the flow of the ordinary processing, resulting in further drawbacks in this system.

SUMMARY OF THE INVENTION

One object of the present invention is to provide a data processing system including an improved buffer memory control means which eliminates the non-coincidence between the content of each buffer memory and that of the main memory.

Another object of the present invention is to provide a data processing system which eliminates the non-coincidence between the content of the buffer memory and that of the main memory, without making the ordinary data processing stagnant.

The present invention is characterized in that, besides a first buffer address array for representing the content of the associated buffer memory, each basic processor is provided with at least a second buffer address array which stores the copy of the content of the first array and is operated independently of the first array.

When one basic processor or an input-output processor performs an operation of writing data into the main memory, the second buffer address arrays of the other basic processors are searched by the store address sent from the one processor. If the second buffer address array of a certain basic processor has an address identical with the store address, the validity bit of the corresponding address in the first buffer address array of the same processor is cancelled.

DESCRIPTION OF THE PREFERRED EMBODIMENT

Figure 1:
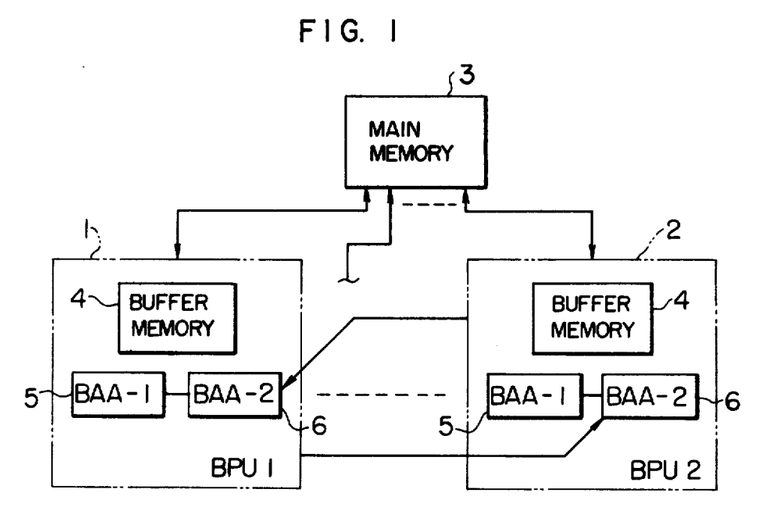
FIG. 1 shows in block diagram a general structure of the data processing system according to the present invention.

FIG. 1 shows the general structure of a data processing system as an embodiment of the present invention. A plurality of basic processing units 1 and 2 (referred to as BPU$_1$ and BPU$_2$) share a main memory 3 and each of the basic processing units has a buffer memory 4. The buffer memory 4 stores the copy of a part of the content of the main memory 3 and the content of the buffer memory 4 is renewed if required. A buffer address array 5 (referred to as BAA-1) serves to indicate which information the buffer memory 4 stores, that is, the BAA-1 stores the main memory addresses of the information stored in the buffer memory 4. A buffer address array 6 (referred to as BAA-2) stores the copy of the content of the BAA-1.

Assuming now that information is written in the main memory 3 by the BPU1, the address of the information written by the BPU1 is transferred to the BAA-2 of the BPU2 so as to avoid the non-coincidence of content between the buffer memory 4 of the BPU2 and the main memory 3. The BAA-2 of the BPU2 which operates independently of the BAA-1 of the same BPU2, checks whether the address sent from the other BPU1 exists in itself or not, and cancels the corresponding part of the content of the BAA-1 if there is the address in the BAA-2. In like manner, when the BPU2 writes information into the main memory, the stored address is sent from the BPU2 to the BAA-2 of the BPU1.

The operations of the buffer address arrays and the associated control circuit will be described in detail with the aid of FIG. 2. In this embodiment, it is assumed that the buffer memory is of congruent or set-associative type. The structure of a buffer address array (BAA) in such a case will be described below.

A buffer address array 11 comprises columns selected in accordance with the lower addresses of block addresses, a region included in each column and called a row in which the upper address of the block address is registered, and flag bits assigned to the respective upper addresses and representing the validities of the upper addresses.

The lower bit 13 of an address register 16 represents an address within a block and if the block address consists of 5 bits, one block is constituted of 32 bytes. The transfer of data into the buffer memory (not shown) is performed with this block as a unit and therefore the supervision by the buffer address array is effected based on the unit. Whether data has been stored in the buffer memory or not can be checked in the following way. The lower address (column address) 14 is decoded by a decoder 17 to select one of the columns. The number of columns is, for example, $2^8 = 256$ if the address 14 consists of 8 bits. The number of bits of the address 14 can be arbitrarily chosen. In each row associated with a column the bits corresponding to the address 15 are stored. Accordingly, in this case where two rows are provided in each column, two upper addresses of two block addresses having the same lower address consisting of 8 bits can be stored. This means that at most two blocks whose lower addresses, each consisting of 8 bits, are identical with each other can be stored in a buffer memory. Each upper address or row address is provided with a validity bit 19. If the validity bit 19 is "1", it shows that useful information of a block whose address has been registered in the buffer address array has been stored in the buffer memory.

In the system according to the present invention, another buffer address array 12 having the same structure as the buffer address array 11 is provided.

Now, description will be made in connection with such a case where the self-reference of a buffer memory is effected by the buffer processing unit which includes its own buffer memory. In FIG. 2 the reference address for self-reference is stored in the address register 16 and the column address 14 in the register 16 is transferred through a selection circuit 20 to a decoder 17. The selection circuit 20 normally selects the address register 16. The addresses and the associated validity bits registered in the rows of the column selected by the output of the decoder 17 are read and sent to comparators 22-1 and 22-2 and latches 23. The validity bit is "1" or "0" depending on whether the address is registered in the row of the selected column or not. On the other hand, the upper or row address 15 of the address register 16 is sent to the comparators 22-1 and 22-2 to check coincidence. When the two addresses are coincident with each other and when the validity bit is "1", gates 24 are opened to set "1" in a register 25. The row number which represents row 0 or row 1 is created by an encoder 26 and set in a register 27. In such a case of a 2-row BAA as in this embodiment, the latch is of 1 bit. When the content of the register 25 is "1", the row number is set through a gate 28 into a register 29. The column address 14 is at the same time set in the register 29 so that the buffer memory is accessed. This is the way that the self-reference of the BAA-11 of a buffer processing unit is performed by the its own processing unit.

The BAA-12 has the same structure as and stores equal data to the BAA-11, and the BAA-12 is referenced by the store addresses of other basic processing units (not shown). The store addresses of these BPU's are sent to registers 36-1, 36-2, . . . , and one of the addresses is selected by a selection circuit 37. The selection may be performed in the order of ascending number of BPU, i.e., in the order from the BPU having a smaller number to the BPU having a larger number. The column address 38 of the store address is sent through a selection circuit 34 to a decoder 35. The selection circuit 34 is so designed as to normally select the column address 38. All the row addresses and the associated valid bits of the column selected by the decoder 35 are sent to comparators 40-1 and 40-2 and latches 41, and the row address 39 is also sent to the comparators 40-1 and 40-2. Just as in the case of the BAA-11, the coincidence signal is set through gates 46 into a register 43 while the row number is set through an encoder 42 into a register 44. If no coincidence is found, that is, no block having the store address is stored in the buffer memory of the BPU in question, no more processing whether is needed. On the other hand, if there is found a coincidence, that is, "1" is set in the register 43, the corresponding data in the BAA-11 must be invalidated. This operation of invalidation will be described later.

Next, the case where no coincidence is found after the reference of the BAA-11 will be described.

If the outputs of the gates 24 are all "0", no required address is considered to be registered in the BAA-11. Accordingly, the main memory is directly accessed in accordance with the content of the address register 16 to read a desired data block. The data block thus read is written in the buffer memory. Whether the data is to be stored in the row 0 or in the row 1, is determined by the priority decision circuit 124. If there is a vacant row, the priority decision circuit 124 selects the vacant row and if there is no vacant row, the previously referenced row is selected for the purpose of replacement. It is necessary that a data block should be stored in a predetermined location in the buffer memory and that the address of the location should be registered in the BAA. A control circuit 125 supplies write instruction 91 and validity bit write data 90 for the selected row. The same instruction 91 and data 90 are supplied also for the BAA-12. The row address 15 and the write instruction 91 are supplied to write-in circuits 30-1, 30-2 and 32-1, 32-2 while write-in circuits 31 and 33 receive the write data 90 and the write instruction 91.

In the registration of such an address, the selection circuit 34 selects the column address 14 in accordance with the instruction 69 from the control circuit 125 and sends the column address to the decoder 35. As a result, the row address 15 and the validity bit "1" are written in the selected rows of the specified columns of BAA-11 and BAA-12, selected in accordance with the column address 14. Accordingly, parts of the stored addresses are renewed in both the BAA-11 and BAA-12.

Now, the processing in the case where the register 43 in the BAA-12 detects a coincidence, will be described. The entry in the BAA-11, in this case, must be canceled. The coincident row number is supplied through a signal line 66 for the control circuit 125. When the signal on the line 67 is "1", the control circuit 125 selects a row number in accordance with the signal on the line 66, instead of the output 86 of the priority decision circuit 124, so that the write instruction 91 is delivered while the validity bit write data 90 becomes "0". Also, in accordance with the signal on the line 68, selection circuit 20 selects the column address 38. As a result, the validity bit of the upper address with which the address of the selection circuit 37 is found coincident becomes "0" and therefore is invalidated.

The case where the demand for self-reference of the associated block is generated from the BPU in question corresponds to the fact that no coincidence has been detected in the BAA-11 and in this case the desired block is read out through accessing to the main memory.

Thus, the content stored in the buffer memory can be prevented from becoming and remaining different from the corresponding content of the main memory. Moreover, whether or not the block corresponding to the store address from another BPU is stored in the buffer memory of the BPU in question can be checked without degrading the normal reference efficiency of the buffer memory.

If a demand for storing data into the buffer memory of the BPU in question is generated, a store address is set into the address register 16 so that a separately prepared write data is written in the location of the main memory and/or the buffer memory specified by the store address. According to this invention, the store instruction causes the gate 45 to open so that the store address is transferred also to other BPU.

Especially in case where the processing system comprises a single BPU and an input-output processor, the store address generated by the BPU need not and cannot be transferred to other BPU's that do not exist. And in this case, only the store address of the input-output processor is transferred to the single BPU.

Figure 2:
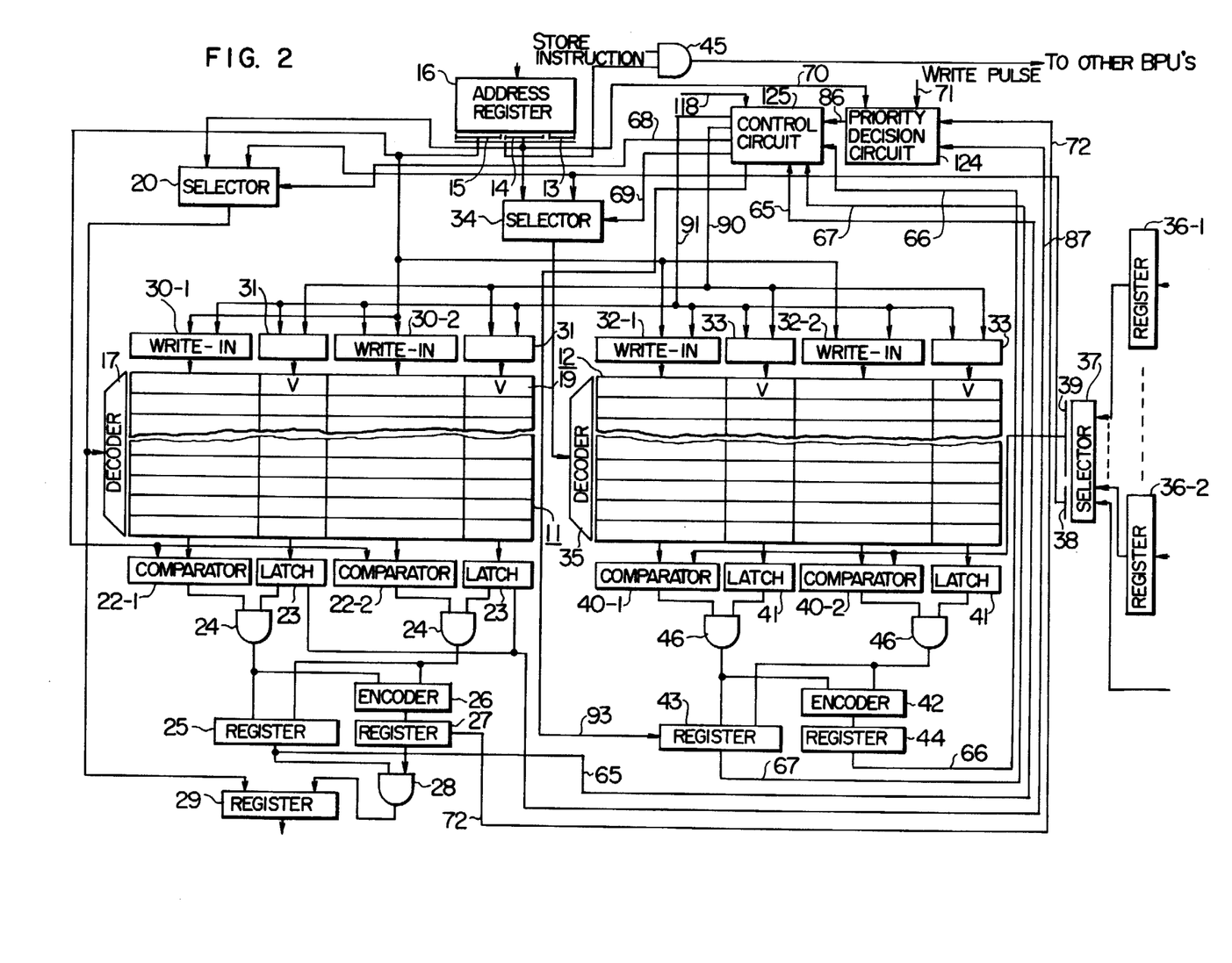
FIG. 2 shows the buffer address arrays according to the present invention.
Figure 3:
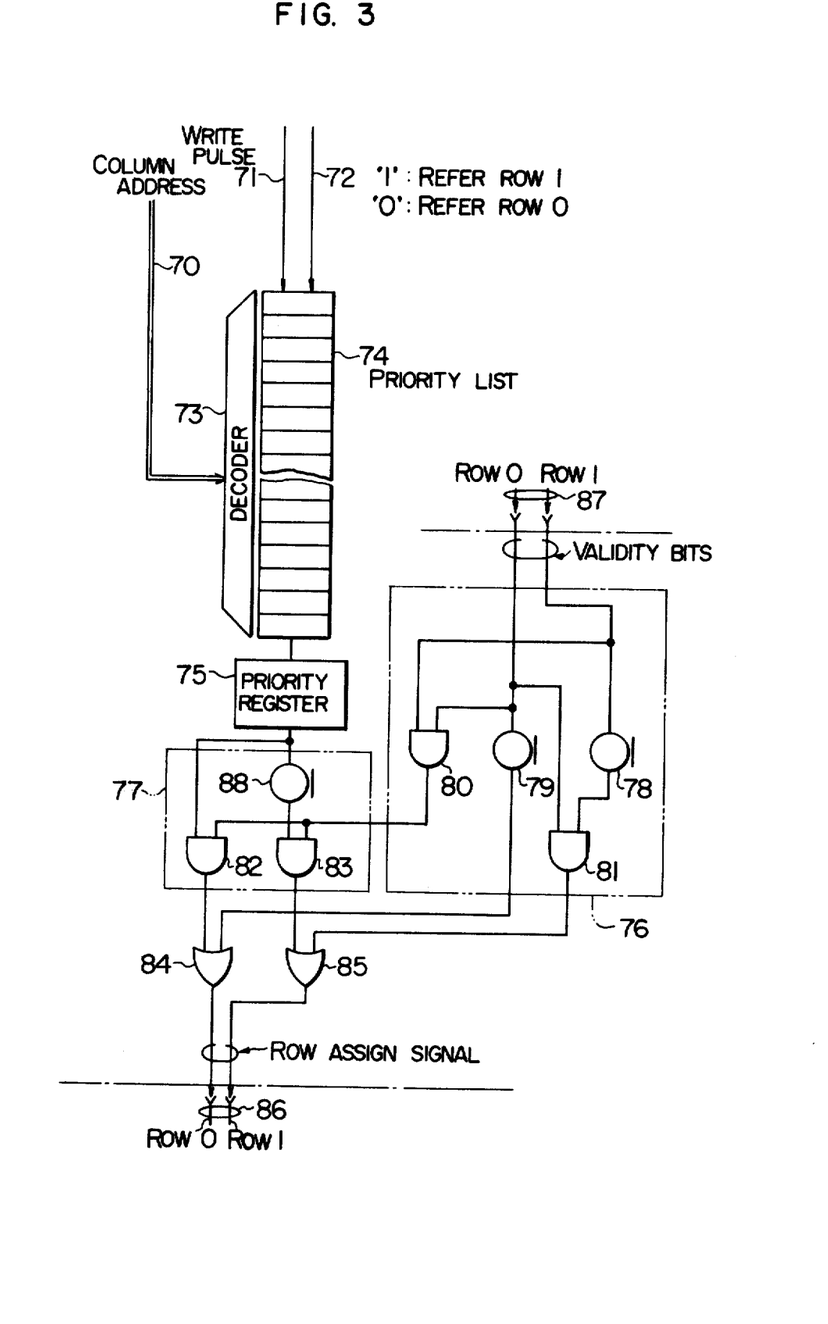
FIG. 3 shows in detail the priority decision circuit used in the system according to the present invention.

FIG. 3 shows an example of the priority decision circuit 124 shown in FIG. 2. In this example, if there is a vacant row, it is selected, but unless there is any vacant row, the previously referenced row is selected for replacement. A priority list 74 is latched whose bit number is equal to that of the columns. The signal on the line 72 is "1" when the row 1 is referred, and "0" when the row 0 is referred. The column address is sent through the line 70 and decoded by the decoder 73 to select one of the latches. The signal on the line 72 is written in the latch specified by the decoder 73, in accordance with the timing of the write pulses 71 generated at the time of reference and of new registration of blocks. As a result, the information of which was used last, row 0 or row 1, is memorized.

The validity bit interpreter 76 receives the validity bits sent through the lines 87. The validity bit "1" indicates that the data has been registered in the associated row of the specified column, and the validity bit "0" corresponds to the vacant condition.

When at least one of the rows 0 and 1 is vacant, an AND gate 80 is not opened so that AND gates 82 and 83 remain closed. When the row 0 is vacant and the row 1 is occupied, the gate 81 is not opened so that the signal "1" appears on only one of the lines 86 which is connected with the row 0. Namely, a signal for selecting the vacant row 0 is generated. On the other hand, when the row 0 is occupied and the row 1 is vacant, the AND gate 81 is opened so that a signal for selecting the row 1 is sent through an OR gate 85. If both the rows 0 and 1 are incidentally vacant, an OR gate 84 is opened to pass the signal for selecting the row 0. When both the rows 0 and 1 are occupied, the AND gates 82 and 83 are selected. The content of the latch specified by the column address 70 is read and written into the register 75. If the content is "1", the signal for selecting the row 0 is sent through the AND gate 82 and the OR gate 84 while if the content is "0", the signal for selecting the row 1 is sent forward. For example, if the content of the register 75 is "1", it indicates that the row 1 was last referenced. Accordingly, the circuit is so designed as to select the row 0 for replacement by anticipating its higher probability of the row 1 being referenced next.

Figure 4:
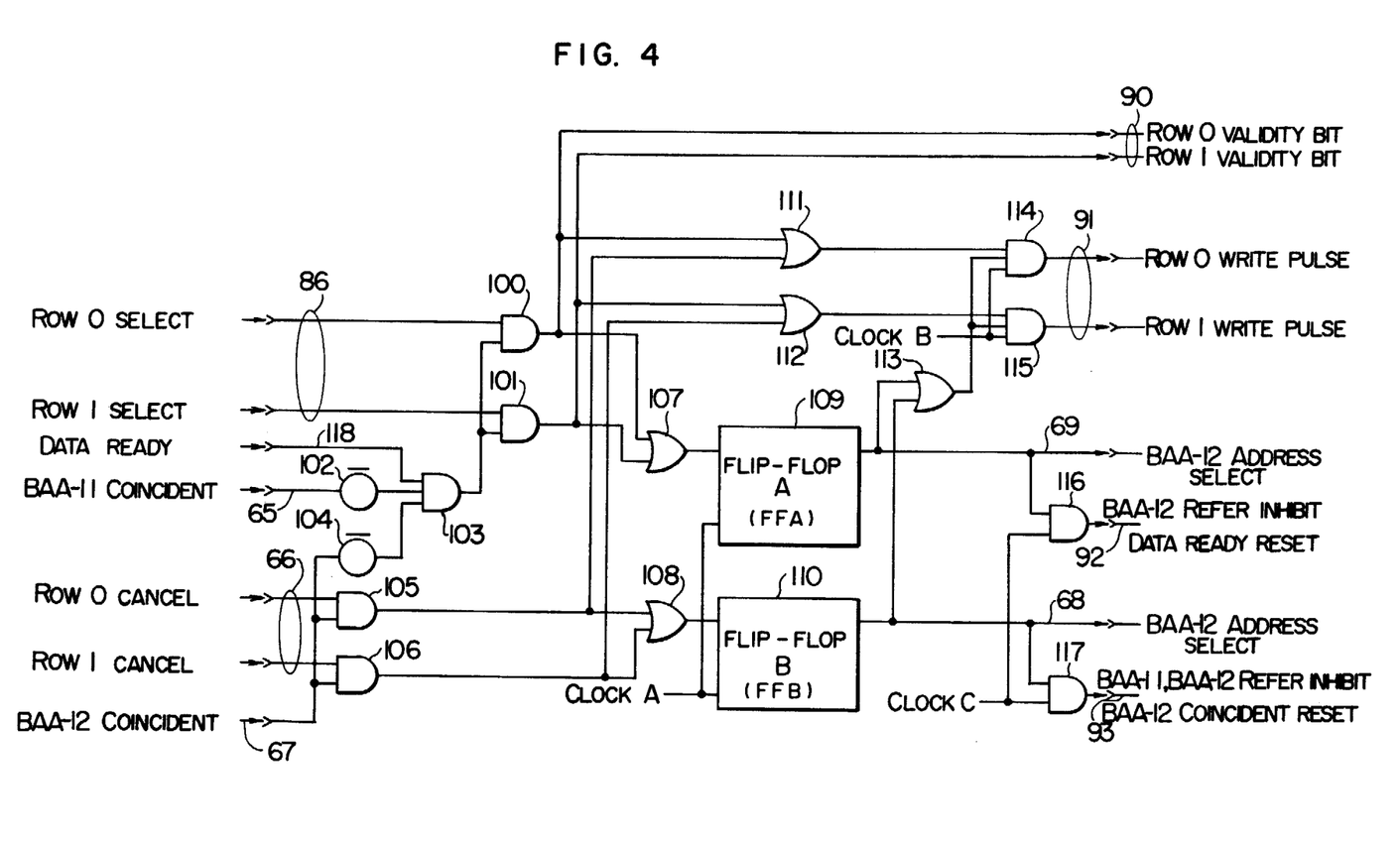
FIG. 4 shows in detail the control circuit used in the system according to the present invention.
Figure 5:
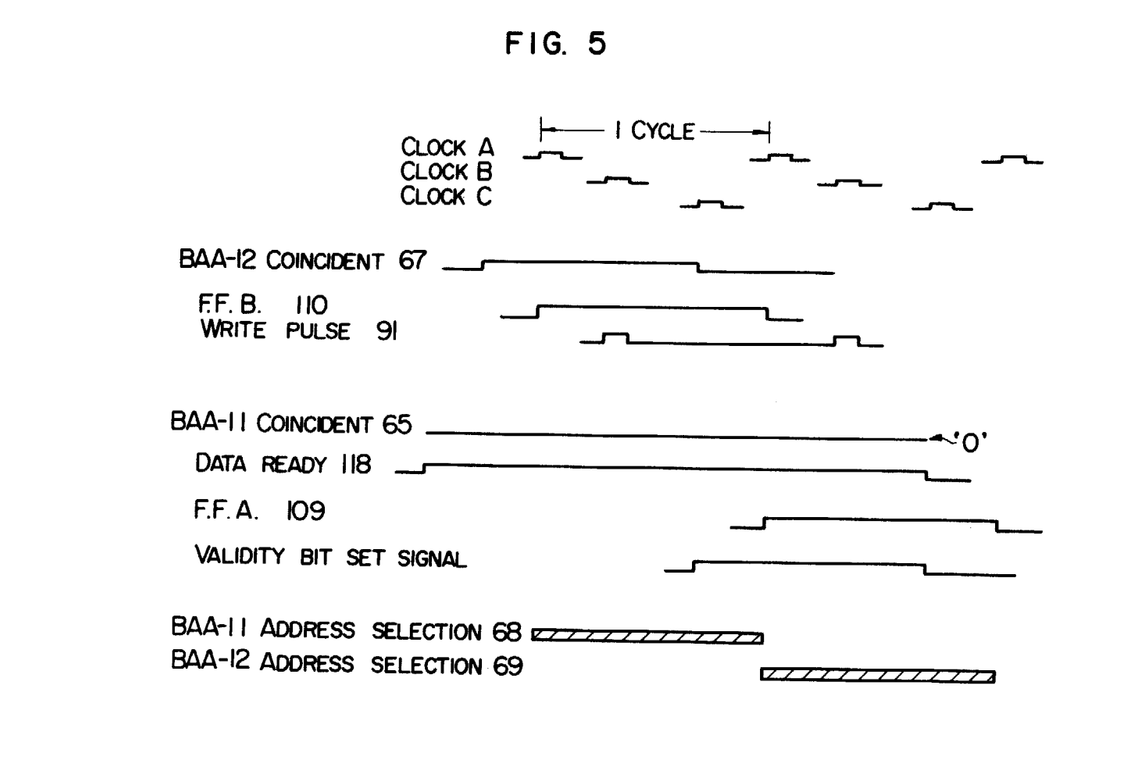
FIG. 5 is a diagram for explaining the operation of the circuit shown in FIG. 4.

FIG. 4 shows an example of the control circuit 125 shown in FIG. 2, and FIG. 5 is a diagram useful for explaining the operation of the example of FIG. 4.

It is assumed that the control circuit 125 receives three clock signals, i.e. clock A, B and C, having different phases, as shown in FIG. 5.

Between the outputs 86 of the priority decision circuit 124, the signal for selecting the row 0 is applied to a gate 100 and the signal for selecting the row 1 is sent to a gate 101. The signal on the line 118 is that which becomes "1" when a data block read out of the main memory is ready to be written in the buffer memory. An AND gate 103 is opened when this signal is "1" and when no coincidence has been detected with respect to both the BAA-11 and BAA-12, that is, both the signals on the lines 65 and 67 are "0". Accordingly, the selected one of the signals on the validity bit write data lines 90 becomes "1". At the same time an OR gate 107 causes the flip-flop 109 (referred to as FFA) to be set, which indicates that the entry of address is going on. Since one of two OR gates 111 and 112 and an OR gate 113 are opened while one of two AND gates 114 and 115 is opened by clock B, the write instruction is delivered to one of the lines 91 connected respectively with the rows 1 and 0. The signal on the line 69 becomes "1" to change the addresses in the selection circuit 34. When this signal is "1", the reference of the BAA-12 must be prevented. The AND gate 116 is opened by a clock C so that the signal for resetting the signal on the line 118 is generated to finish the operation of address registration.

The case where the coincidence signal on the line 67 with respect to the BAA-12 is "1" will be described. If the signal 67 is "1", the AND gate 103 is closed and FFA 109 remains reset by a clock A. Since the AND gates 100 and 101 are both closed, the validity bit write signals on the lines 90 are both "0". One of two AND gates 105 and 106 is opened by the signals on the lines 66, representing row numbers, so that a flip-flop 110 or FFB is set. In the same manner as mentioned above, one of the write instruction signals 91 becomes "1" in accordance with the signal 66. Then, the selection signal 68 to the selection circuit 20 becomes "1" to change column addresses. Since the validity bit write data is "0" and the write instruction is delivered, the validity bit of the specified row becomes "0". An AND gate 117 is opened by the clock C so that the signal 93 for resetting the coincidence signal 67 is delivered to finish the operation of entry cancellation. When the operations of registration and of cancellation take place simultaneously, the cancellation operation is given priority over the registration since the inverted version of the signal 67 is applied to the input of the AND gate 103 through an inverter circuit 104.

Figure 6:
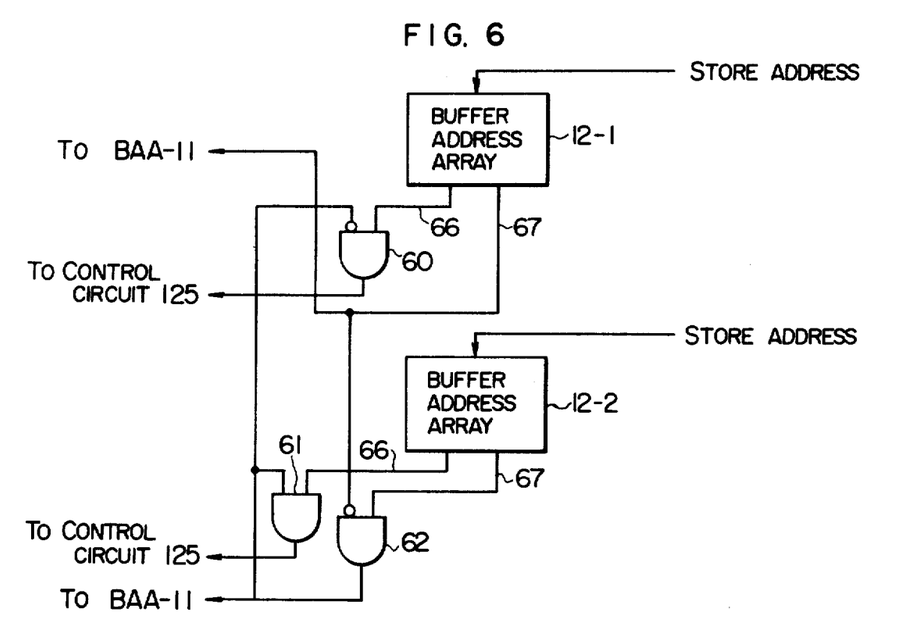
FIG. 6 shows another embodiment of the present invention.

According to another embodiment of the present invention, besides a first BAA for the self-reference of the basic processing unit which includes the first BAA, there are provided a plurality of BAA's each of which stores the copy of the content of the first BAA and each of which is subjected to the search by the store address from other basic processing unit. For example, in the multiprocessing system comprising three BPU's, each BPU has two BAA's which are adapted for the other BPU's and each of which is searched by the other corresponding BPU. Accordingly, whether the store address sent from the other BPU is stored in the buffer memory of the BPU in question or not can be checked without any delay. FIG. 6 shows such an example as described directly above. BAA 12-1 and BAA 12-2 are provided to receive the store addresses from other BPU's. The coincidence signal 67 delivered from the BAA 12-1 is sent to another BAA-11 while the signal 66 representing row number is applied through a gate 60 to the control circuit 125. In the case where a coincidence is delivered by the BAA 12-1, even if the BAA 12-2 delivers a coincidence signal, both the gates 61 and 62 are closed. After the coincidence signal 67 from BAA 12-1 has vanished, the signals 66 and 67 are sent through the gates 61 and 62.

According to another embodiment of the present invention, the buffer memories are managed by using a so-called associative system, in which the BAA has a single row. For example, one address consists of 24 bits and the lowermost 5 bits constitutes the address within a block, with one sector composed of 8 blocks. So, the addresses are managed from sector to sector. Namely, the upper 16 bits of the address having 24 bits are entered in the BAA. The buffer memory can store 8 blocks at a single entry into the BAA. The number of entries depends on the capacity of the used buffer memory and is usually 16 or 32. Moreover, each entry is furnished with a validity bit for indicating the validity of the associated entry address.

According to yet another embodiment of the present invention, the BAA's for the reference of the store addresses from other basic processing units have no validity bit. Accordingly, there is no need for such circuit elements as the write circuit 33, the latch 41 and the gate 46, and the operation of resetting the validity bit is performed only for the BAA-11.

I claim:

1. In a memory control system for a data processing system, which memory control system includes a main memory, a basic processing unit which carries out processing operations with respect to information read-out from and written into said main memory, at least one additional processing unit which also carries out processing operations with respect to information read-out from and written into said main memory, said main memory being adapted to be accessed by said processing units, the improvement wherein at least said basic processing unit comprises a buffer memory for reading-out and writing-in a predetermined amount of information stored in said main memory;

first register means, coupled to said main memory, for storing the address of said main memory which corresponds to information stored in said buffer memory;

first detector means, coupled to said first register means, for detecting whether or not there is stored in said first register means an address corresponding to an address signal produced within said basic processing unit representative of an address location in said main memory;

second register means, coupled to said main memory, for storing a copy of the contents of said first register means;

second detector means, coupled to said second register means, for detecting the storage address in said main memory into which storage address information is to be written by an additional processing unit; and means, coupled to said first and second detector means, and responsive to the writing of information into said storage address of said main memory by said additional processing unit, so that information stored in said buffer memory may differ from that stored in said main memory and may, therefore, no longer be valid information, for invalidating a predetermined amount of information which is contained within the information stored in said buffer memory, said predetermined amount of information including that information which is written into said main memory by said additional processing unit.

2. The improvement according to claim 1, wherein each at least one additional processing unit comprises its own buffer memory for reading-out and writing-in a predetermined amount of information stored in said main memory;

initial register means, coupled to said main memory, for storing the address of said main memory which corresponds to information stored in said its own buffer memory;

initial detector means, coupled to said initial register means, for detecting whether or not there is stored in said initial register means an address corresponding to an address signal produced within said additional processing unit representative of an address location in said main memory;

secondary register means, coupled to said main memory, for storing a copy of the contents of said initial register means;

secondary detector means, coupled to said secondary register means, for detecting that storage address in said main memory into which storage address information is to be written by another processing unit; and means, coupled to said initial and secondary detector means, and responsive to the writing of information into that storage address of said main memory by said another processing unit, so that information stored in said its own buffer memory may differ from that stored in said main memory and may, therefore, no longer be valid information, for invalidating a prescribed amount of information which is contained in the information stored in said its own buffer memory, said prescribed amount of information including that information which is written into said main memory by said another processing unit.

3. The improvement according to claim 2, further comprising means for supplying, over a first address path provided between said basic processing unit and the secondary detector means of said at least one additional processing unit, the address of information to be written into said main memory by said basic processing unit, and means for supplying, over a second address path provided between said at least one additional processing unit and the second detector means of said basic processing unit, the address of information to be written into said main memory by said at least one additional processing unit.

4. The improvement according to claim 1, further comprising address coupling means, coupled from said at least one additional processing unit to said basic processing unit, for applying the address of information to be written into said main memory by said at least one additional processing unit to the second detector means of said basic processing unit.

5. The improvement according to claim 1, in which said buffer memory is divided into a number of columns, each of said columns including
a plurality of blocks, and
in which each of said first and second register means includes
registers for storing, in correspondence to said respective blocks, the upper portions of the respective addresses of the information stored in said respective blocks,
validity portions representing the fact that valid information is stored in said respective blocks,
means for setting the upper portions of the address of information stored in said buffer memory from said main memory, and
means for setting the validity portion corresponding to the block into which the information is stored.

6. The improvement according to claim 5, in which said first detector means includes
first reading-out means for reading out the address stored in each of the registers thereof,
first gate means for gating the address read out by said first reading-out means from the validity portion corresponding to said read-out address, and first commparing means for comparing the output of said first gate means with the address derived from said basic processing unit, and in which said second detector means includes
second reading-out means for reading out the address stored in each of the registers thereof,
second gate means for gating the address read-out by said second reading-out means from the validity portion corresponding to said read-out address, and
second comparing means for comparing the output of said second gate means with the address of information to be written in said main memory by said at least one additional processing unit, and
said invalidating means including
means for resetting at least the validity portion of said first register means corresponding to the address of information to be written in said main memory by said at least one additional processing unit.

7. In a memory control system for a data processing system, which memory control system includes a main memory, a basic processing unit which carries out processing operations with respect to information read-out from and written into said main memory, a plurality of additional processing units which also carry out processing operations with respect to information read-out from and written into said main memory, said main memory being adapted to be accessed by said processing units, the improvement wherein at least said basic processing unit comprises
a buffer memory for reading-out and writing-in a predetermined amount of information stored in said main memory;
first register means, coupled to said main memory, for storing the address in said main memory which corresponds to information stored in said buffer memory;
first detector means, coupled to said first register means, for detecting whether or not there is stored in said first register means an address corresponding to an address signal produced within said basic processing unit representative of an address location of said main memory;
a plurality of second register means, respectively corresponding to the plurality of additional processing units, and coupled to said main memory, for storing a copy of the contents of said first register means;
a plurality of second detector means, respectively corresponding to the plurality of additional processing units, and respectively coupled to said plurality of second register means, for detecting the fact that the respective addresses of information to be written into said main memory by different ones of said plurality of additional processing units are stored in corresponding ones of said plurality of second register means; and
means, responsive to the result of detection by said second detector means, representative of the fact that information stored in said buffer memory may differ from that stored in said main memory and, therefore, may no longer be valid information, for invalidating a predetermined amount of information stored in said buffer memory, said predetermined amount of information including that information which is written into said main memory by any one of said plurality of additional processing units.

* * * * *